Oct. 29, 1957  G. A. SARGENT  2,811,690

METHOD FOR TESTING HELIX PITCH

Filed Dec. 30, 1953

INVENTOR
G. A. SARGENT
BY A. J. Torsiglieri
ATTORNEY

United States Patent Office 2,811,690
Patented Oct. 29, 1957

2,811,690

METHOD FOR TESTING HELIX PITCH

George A. Sargent, Bloomfield, N. J., assignor to Bell Telephone Laboratories, Incorporated, New York, N. Y., a corporation of New York Application December 30, 1953, Serial No. 401,197

5 Claims. (Cl. 324—34)

This invention relates to methods and apparatus for detecting electrically winding pitch imperfections in helically wound conductors, both of the kind uniformly wound and of the kind in which the pitch varies in a prescribed manner.

A helically wound conductor is an important element in a helix-type traveling wave tube wherein the helix serves as a circuit for propagating a slow electromagnetic wave in coupling relation with an electron beam over a plurality of operating wavelengths. In such an application, it is important to avoid winding pitch imperfections in the helix since any such imperfection affects adversely its wave propagating characteristics and makes it difficult to have reproducible characteristics from tube to tube. For these reasons, it is desirable to check at various points in the tube's manufacture for any imperfections in the helix winding pitch.

In many cases, the helix is wound of fine wire, only several mils in diameter. Such a helix is fragile and difficult to handle, and it becomes advantageous to minimize all physical handling of the helix. If physical contact with the helix turns is to be avoided it becomes difficult to check the helix pitch accurately and conveniently with conventional measurement techniques. Moreover, for obvious reasons, it is advantageous if the pitch testing can be done quickly and by relatively unskilled personnel utilizing a minimum of complex equipment.

The object of the present invention is to facilitate the testing for winding pitch imperfections in helices to the principal end that the manufacture of helix-type traveling wave tubes will be facilitated, and the quality and uniformity of the tubes enhanced.

In the practice of the invention, use is made of the discovery that the uniformity of the longitudinal magnetic field surrounding a helix in which is flowing an alternating current is measurably disturbed in regions in which the helix pitch winding has irregularities or nonuniformities as slight as only one percent. This characteristic of a helix makes it possible to test electrically for winding pitch irregularities in a manner which relies on inductive coupling and avoids physical contact with the helix except at its two ends. For utilizing this discovery, a search coil which is shielded except for a short gap which is positioned adjacent the helix is moved along the magnetic field of the helix and any changes in the current induced in the search coil are detected.

Moreover, in the interest of reproducibility it is generally desirable that the winding pitch of each helix be similar to that of a standard helix. In this way, uniformity from helix to helix is achieved. This end can conveniently be realized in accordance with the invention by comparing the helix under test with a standard helix. Moreover, in some instances a helix whose pitch varies along its length in a prescribed fashion becomes important for utilization in a traveling wave. For example, it is known that the match between a helix and a wave guide coupling connection is enhanced by tapering the pitch of the helix at the end being coupled for impedance matching. With such helices, it is highly desirable to compare the winding pitch to that of a standard helix.

Alternatively, where the uniformity of pitch in a single helix is of primary concern, the pitches of various portions of the one helix may be compared with one another for irregularities. Moreover, by comparing the pitch of the helix portion under test either with another portion of the same helix or with a standard helix, there is made possible the use of null-signal balancing techniques, which, as is well known to the electrical measurement art, results in enhanced sensitivities. For these reasons, in the usual practice of the invention, there are utilized two search coils, and the voltages induced in the two coils are made to be in series opposition so that only their difference acts to set up current flow through the indicating means. Moreover, by utilizing two search coils in conjunction with a standard and a test helix and moving the two search coils in synchronism, there can be balanced out end effects and two helices of non-uniform pitch may be compared.

In such arrangements, it is important that the magnitude of the alternating current flowing in the two helix portions being compared be the same since the currents induced in the search coils are related to the currents in the helix portions. In arrangements where two portions of the same helix are being compared, this condition is inherently satisfied. In arrangements where a standard and a test helix are being compared, to avoid the need for highly regulated voltage sources, the two helices can be serially connected with an alternating voltage source.

The invention will be better understood from the following more detailed description taken in conjunction with the accompanying drawings in which.

Figure 1:
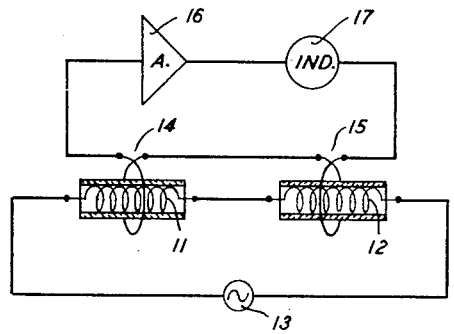
Fig. 1 shows schematically an arrangement in accordance with the invention for comparing the winding pitch of a test helix with that of a standard helix.

With more particular reference to the drawings, in the illustrative test arrangement shown in Fig. 1, a standard helix 11 and a test helix 12, which are to be compared, are serially connected with a source of alternating voltage 13. A frequency of 1,000 cycles for this source has been found convenient for the purposes of the invention. Too low a frequency makes for poor sensitivity, too high a frequency raises problems of stray capacitances and phasing. Each of the helices is supported in glass tubing for rigidity. It may be advantageous to shield the two helices magnetically from one another to minimize mutual inductance effects. Associated with the helices 11, 12 and linked to the magnetic field surrounding the helices are the search coils 14, 15, respectively. Advantageously, the search coils closely surround the glass envelopes. The details of the search coils will be discussed in greater detail below with reference to Fig. 3. In the interest of simplicity, in Fig. 1 each search coil is shown as a single loop coaxially surrounding its corresponding helix and the supporting glass envelope. The two coils 14 and 15 are connected so that the voltages induced therein by the magnetic fields surrounding the helices are in opposition but in other respects they will be substantially duplicate. Any net voltage induced in the two coils is utilized to supply a signal voltage to the amplifier 16 and the amplified signal is used to energize an indicator 17 which gives a visual or auditory indication. Typically such an indicator may be a cathode ray oscilloscope, a meter, or a buzzer.

In the practice of the invention, the search coil 15 is moved along coaxial with the test helix 12. The search coil 14 may either be similarly moved with respect to the standard helix 11 or kept immobile. When the two coils are moved in synchronism in such a manner that corresponding points of the two helices are always being compared, it is possible to compare the two helices over the entire length of the test helix, since presumably the end effects and the effects of any deliberate non-uniformities along the two helices will be similar, if the two helices are in fact identical. Accordingly, it can be seen that this technique has wide flexibility. Alternatively, when search coil 14 is kept immobile opposite a region of the standard helix sufficiently in from its ends so that end effects are insignificant, while the search coil 15 is moved relative to the test helix, the intermediate regions of the two helices may be compared. However, at the ends of the test helix, the end effects will result in an unbalance in the induced voltages not properly attributable to helix winding differences. However, by the proper design of the search coils, such end effects can be minimized and limited to very short end regions where winding imperfections in many cases will little influence the operating characteristics. Where it is convenient not to compare end regions, still another possibility is to wind each helix initially longer than desired and then cut off the untested end portions once the intermediate portion has been found satisfactory.

Figure 2:
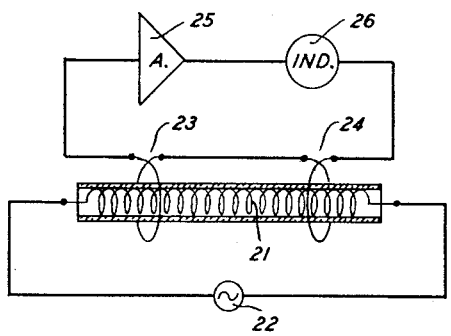
Fig. 2 shows schematically an arrangement in accordance with the invention for checking for irregularities in the winding pitch of a helix.

In the illustrative arrangement shown in Fig. 2, the single helix 21 being tested which is supported in glass tubing is connected to the alternating voltage source 22, and the two search coils 23 and 24 are positioned spaced apart therealong closely surrounding the support tubing for coupling to the magnetic field of the helix. The two search coils are connected so that the voltages induced therein will be in series opposition. As in the previously described arrangement, any net induced voltage serves as a signal voltage which is applied to the amplifier 25 and after amplification is used to energize the indicator 26.

As in the previously described arrangement, it is possible to move either both search coils simultaneously along the helix or only one, leaving the other in a fixed position. When both are moved, spaced closely together, there is facilitated the localizing of the position of any non-uniformity which does exist. When only one of the search coils is moved, the one kept fixed is advantageously positioned opposite a region of the helix sufficiently in from the end to be relatively free of the end effects.

Moreover, by arranging to have the search coils positioned continuously at opposite regions symmetrically disposed with respect to the midpoint of the helix length, end effects can be balanced out at the two end regions of the helix and the symmetry of the helix about its midpoint may be checked.

Figure 3:
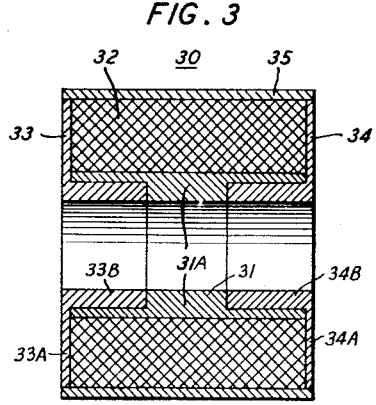
Fig. 3 is a sectional view of a search coil suited for use in the practice of the invention.

Fig. 3 shows in greater detail a cross section of a typical search coil 30 for use in the practice of the invention. An annular cylinder 31 of a non-magnetic material, such as brass serves as the core on which the coil 32 is wound in insulated multiple layers. Additionally, to confine the magnetic coupling to the coil to a short gap, the coil is shielded magnetically except for a short gap. To this end, the core is fitted with end plates 33, 34 of a magnetically soft material, such as Permalloy, which include annular end portions 33A, 34A, and collar-like portions 33B, 34B which abut shoulders in the core 31. Additionally, a cylindrical cover plate 35 forms an enclosing low reluctance path between the end plates 33, 34. As a consequence, the coil 32 is shielded magnetically except along the center portion 31A of the core which lies between the two flange-like portions 33B, 34B of the end plates 33, 34, respectively. Provision is made for electrical connections to the two ends of the coil 32.

The principles of the invention have been utilized successfully to check the uniformity of helices wound of wire of several mils in diameter to more than a hundred turns per inch.

It is to be understood that the specific embodiments shown and described are merely illustrative and that various modifications may be made without departing from the spirit and scope of the invention.

What is claimed is:

1. The method of comparing the winding pitch of first and second sections of a helical coil, each said helical section having a terminal point, comprising the steps of passing an alternating current serially through said first and second helical sections; simultaneously moving first and second search coils, which surround coaxially the first and second sections, respectively, of said helical coil, respectively along portions equidistant from the terminal point of first and second sections of said helical coil; and measuring the difference in voltage induced in the first and second search coils.

2. The method of testing a helical coil comprising the steps of passing an alternating current serially through the helical coil to be tested and a standard helical coil; moving in synchronism first and second search coils, which surround coaxially the helix to be tested and standard helix respectively, along corresponding portions of the length of the helical coil to be tested and the length of the standard helical coil; and measuring the difference in voltage induced in the first and second search coils.

3. The method of testing a helically wound conductor comprising the steps of passing an alternating current serially through the conductor to be tested and a standard helical conductor, each of which is being supported along its length by a nonmagnetic supporting structure; moving first and second search coils, which surround coaxially the helix to be tested and the standard helix respectively, in synchronism along corresponding portions of the length of the conductor to be tested and a standard conductor respectively; and measuring the difference in voltage induced in the first and second search coils.

4. The method of testing a helically wound coil comprising the steps of passing an alternating current serially through the helical coil to be tested, positioning first and second search coil to surround coaxially the helix to be tested, simultaneously moving the first and second search coils along corresponding portions of the length of the helix to be tested, and measuring the difference in voltage induced in the first and second search coils.

5. The method of checking the pitch of a helically wound coil whose pitch is nonuniform along its length varying symmetrically about the center section of the helix, comprising the steps of passing an alternating current through the nonuniform wound helical coil, positioning first and second search coils to surround coaxially said helix on opposite sides of the said central section, simultaneously moving the first and second search coils along corresponding points of the helix so as to maintain the two search coils equidistant from the central section of the helical coil, and measuring the difference in voltage induced in the first and second search coils.

References Cited in the file of this patent

UNITED STATES PATENTS

| | | |
|---|---|---|
| 1,992,013 | Palueff | Feb. 19, 1935 |
| 2,065,118 | Davis | Dec. 22, 1936 |
| 2,124,579 | Knerr et al. | July 26, 1938 |
| 2,415,789 | Farrow | Feb. 11, 1947 |
| 2,435,985 | Stewart et al. | Feb. 17, 1948 |
| 2,508,494 | Cook et al. | May 23, 1950 |